W. B. UPDEGRAFF.
AUTOMATIC APPARATUS FOR MEASURING AND INDICATING SIZES OF TILES, &c.
APPLICATION FILED JUNE 17, 1910.
992,926.
Patented May 23, 1911.
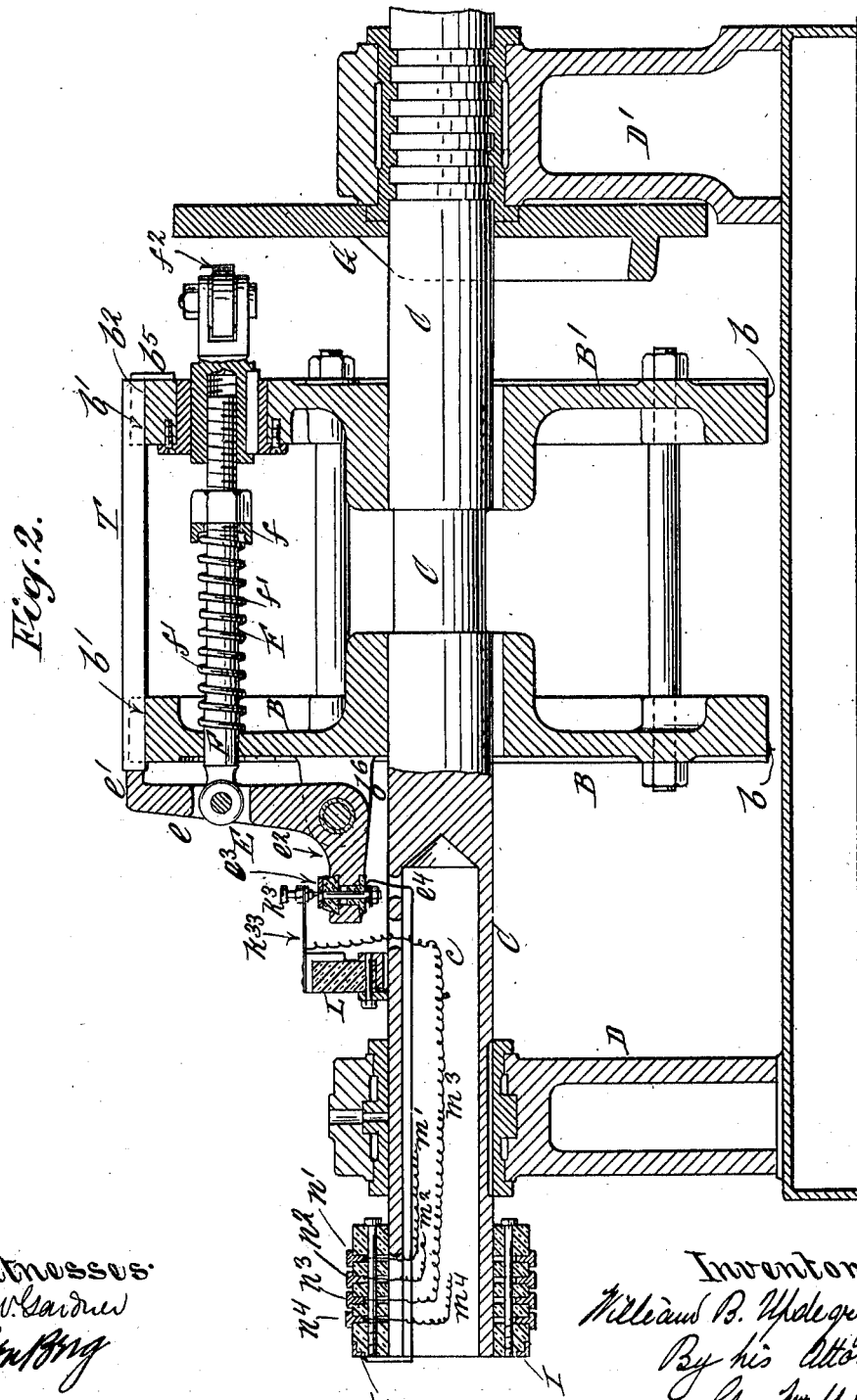

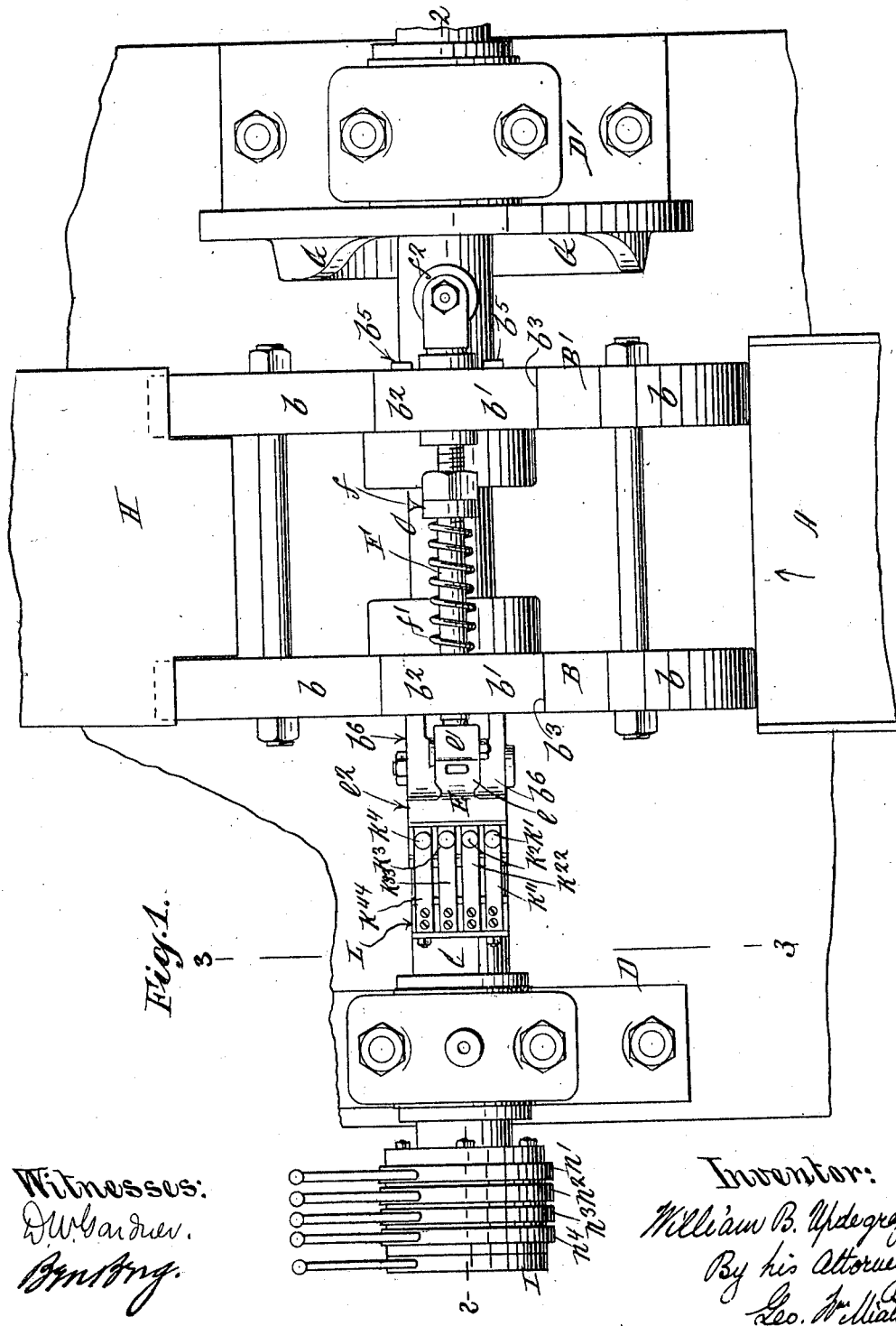

W. B. UPDEGRAFF.
AUTOMATIC APPARATUS FOR MEASURING AND INDICATING SIZES OF TILES, &c.
APPLICATION FILED JUNE 17, 1910.
992,926.
Patented May 23, 1911.
4 SHEETS—SHEET 3.
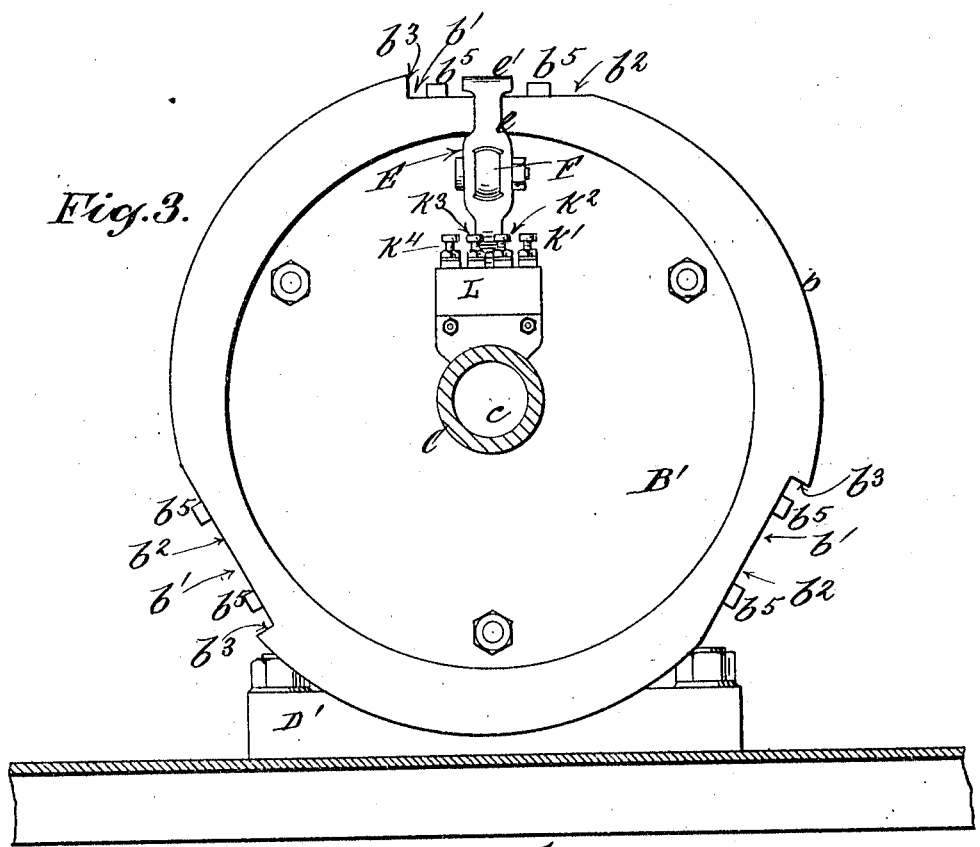
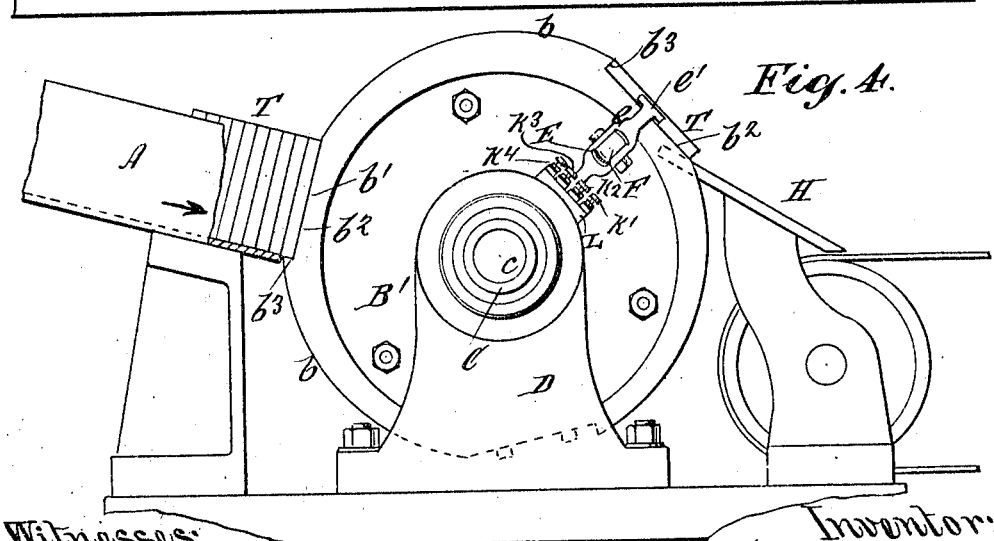

W. B. UPDEGRAFF.
AUTOMATIC APPARATUS FOR MEASURING AND INDICATING SIZES OF TILES. &c.
APPLICATION FILED JUNE 17, 1910.
992,926.
Patented May 23, 1911.
4 SHEETS—SHEET 4.
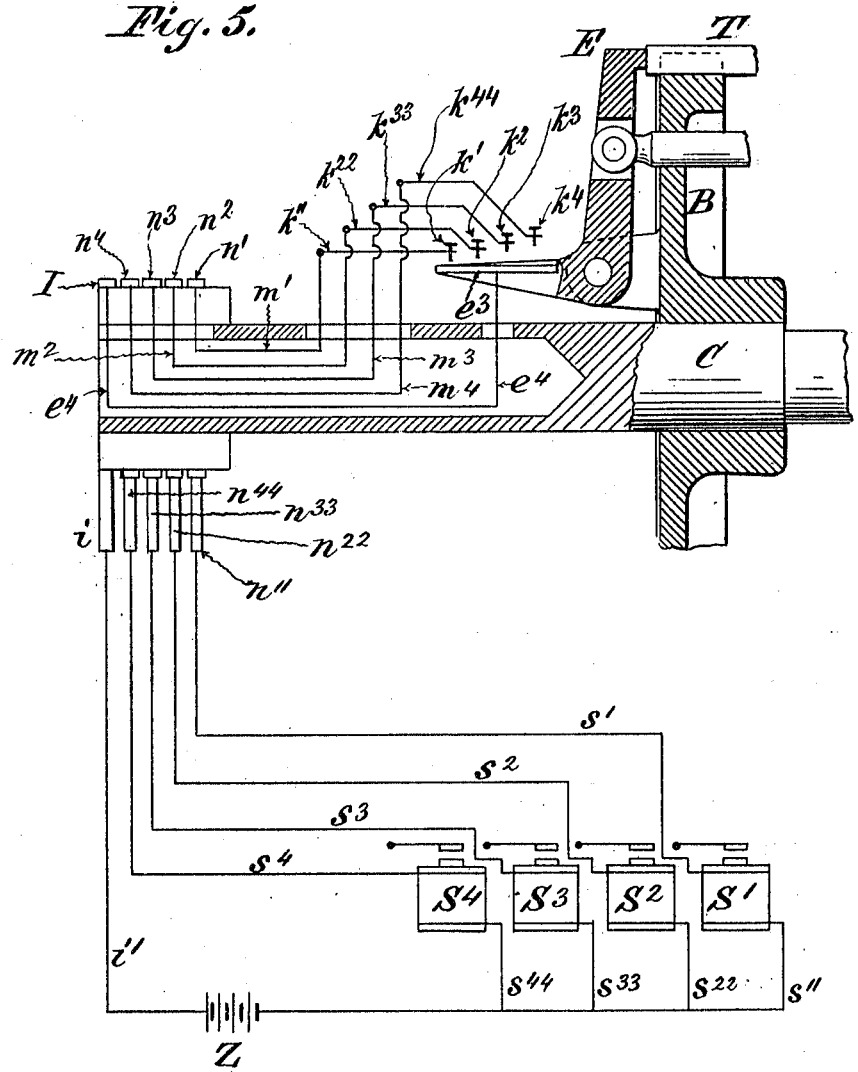

UNITED STATES PATENT OFFICE.

WILLIAM B. UPDEGRAFF, OF NEW YORK, N. Y.

AUTOMATIC APPARATUS FOR MEASURING AND INDICATING SIZES OF TILES, &c.

992,926.

Specification of Letters Patent.    Patented May 23, 1911.

Application filed June 17, 1910. Serial No. 567,349.

*To all whom it may concern:*

Be it known that I, WILLIAM B. UPDEGRAFF, a citizen of the United States, residing in the borough of Manhattan, city, county, and State of New York, have invented certain new and useful Improvements in Automatic Apparatus for Measuring and Indicating Sizes of Tiles, &c., of which the following is a specification.

My invention is designed to afford automatic means for measuring and indicating variations in size of tiles and similar articles, in order that they may be sorted, marked or otherwise designated or classified, as may be found most expedient in practice; and the invention consists essentially in the construction and arrangement of parts substantially as described and claimed specifically, whereby the articles to be measured are successively and mechanically fed to a feeler which actuates electrical means by which the size of each article is indicated as hereinafter set forth.

I herein show and describe my invention as applied to the measurement of tiles, to which use it is especially adapted although not necessarily limited thereto.

For various reasons well known in the art tiles vary in dimensions when finished. Even when compressed in molds of exactly the same dimensions these variations occur by reason of difference in density, pressure, and shrinkage during firing, to such an extent that sorting according to size is essential before use. Heretofore the sorting has been done by hand with the aid of gage plates, but this method is slow and inaccurate.

As ordinarily used, tiles are arranged in parallel rows, the shorter edges abutting each other midway of the length of adjacent tiles. Hence variations in length will cause the tiles to "creep" or crowd in one direction or the other as related to the rows of tiles previously laid, thus preventing the perfect alinement of the medial or cross joints and marring the symmetrical effect which is so desirable, if not absolutely essential, under ordinary conditions of use.

The shrinkage due to firing takes place in all directions,—that is, it is shrinkage of volume and affects the length, width and thickness of the tile; but as the shrinkage is in proportion to the dimensions it follows that by gaging one dimension, all dimensions are necessarily gaged. Therefore by gaging the longest dimension I not only gage the area of the face of the tile, but utilize the direction of greatest possible variation for the purpose of indicating the size of the tile,—a matter of practical importance when variations of 1/32 or less of an inch are to be detected and recorded.

In my concurrent application No. 567,350 filed June 17th 1910, I set forth basically my method of gaging tiles &c., consisting essentially in placing the tile between a stationary part and a feeler which latter causes certain electrical connections to be made dependent on the length of the tile.

The object of my present application is to afford means for accomplishing this result automatically and the distinctive feature is the use of mechanism for successively taking up and presenting the tiles to the feeler.

In the accompanying drawings, Figure 1, is a plan of apparatus embodying the essential features of my invention; Fig. 2, is a central longitudinal sectional elevation taken upon the plane of the line 2—2— Fig. 1; Fig. 3, is a transverse section taken upon the plane of the line 3—3— Fig. 1; Fig. 4, is an end view upon a smaller scale, partly broken away, to show the feed. Fig. 5 is a diagrammatic view representing the electrical circuits, connections &c.

A, represents a chute in which the tiles T, to be measured are placed resting on their longitudinal edges, and down which they slide by gravity, the lowest in the pile resting against the peripheral surfaces $b$, $b$, of the forwarding disks B, B'. Each forwarding disk B, B', is formed with one or more tile pockets $b'$, $b'$, those in the two disks being coincident with relation to each other horizontally. I have shown each disk formed with three of these pockets, although the number is not material. Each pocket $b'$, consists of a flat rest $b^2$, and a rectangular forwarding shoulder $b^3$, which engages the edge of the tile. The peripheral surfaces between the rests $b^2$, and the shoulders $b^3$, are eccentric with relation to the axis of the forwarding disks B, B', so that the tiles are successively and gradually lowered into the pockets $b'$, as the forwarding disks rotate; the latter being rigidly secured to the shaft C, mounted on bearings D, D', and said shaft being driven by any suitable means. Each pocket $b'$, on the forwarding disk B', is formed with one or more fixed gaging rests $b^5$, against which one end of the tile rests when in the pocket, and against which the tile is pressed during measurement as hereinafter set forth.

For each set of coinciding tile pockets $b'$, formed in the forwarding disks B, B', I provide separate feeling and indicating mechanism, like unto that shown in the drawings, and here described, the others being omitted for briefness and simplicity of illustration. With this understanding, E, represents a rock lever fulcrumed on bracket lugs $b^6$, projecting from the outer side of the forwarding disk B. The upper arm $e$, of this rock lever E, performs the function of a feeler, being formed with a finger $e'$, for contact with the end of the tile T presented for measurement.

Pivotally attached to the feeler arm $e$, is a feeler rod F, mounted in bearings in the forwarding disks B, B', in such manner as to be capable of longitudinal movement. Interposed between the inner side of the forwarding disk B and an adjustable rest $f$, on the feeler rod F, is a coiled spring $f'$ encircling said rod, the adjustment of the rest $f$, affording means for regulating the tension or pressure to be exerted by the feeler arm $e$, against the tile during measurement, it being understood that the tile during the operation is pressed against the gage rests $b^5$, on the other forwarding disk B'.

Upon the opposite end of the feeler rod F, beyond the disk B', is mounted a roller $f^2$. This roller $f^2$, protrudes into the path of a stationary cam G, formed and arranged to contact with the roller $f^2$, in the interval between the discharge of a measured tile onto the chute H and the taking up of another tile from the chute A. In other words the cam G, forces back the feeler arm $e$, against the resistance of the spring $f'$, to receive or discharge a tile, but does not act on the roller $f^2$, between the take up and discharge, leaving the spring free to press the feeler arm $e$, and finger $e'$, against the end of the tile during transit from feed chute A, to discharge chute H, it being understood that the rotation of the forwarding disks, feeling mechanism &c., is continuous during operation.

The lower or signal arm $e^2$, of the rock lever E, carries an electric circuit closer $e^3$, connected by a conductor $e^4$, passing through the hollow end $c$, of the shaft C, with the commutator bars I, insulated on the end of the shaft C.

When the roller $f^2$, leaves the cam G, allowing the spring $f'$, to rock the lever E to feel the tile T, the circuit closer $e^3$, on the signal arm $e^2$, of the said lever E, contacts successively (according to the length of the tile) with a series of contact points consisting preferably of screws $k'$, $k^2$, $k^3$, $k^4$, Fig. 1 mounted on independent spring tongues $k''$, $k^{22}$, $k^{33}$, $k^{44}$, attached to an insulated block L secured rigidly to the shaft C. The spring tongues $k''$, $k^{22}$, $k^{33}$, $k^{44}$, are connected electrically and individually by conductors $m'$, $m^2$, $m^3$, $m^4$, passing through the hollow end $c$, of the shaft C, with collector rings $n'$, $n^2$, $n^3$, $n^4$, mounted upon the end of the shaft C, but insulated therefrom and from each other.

The contact screws are so adjusted with relation to each other that the circuit closer $e^3$, on the signal arm E, will first contact with contact screw $k'$, representing the maximum length of tile; then successively with the other contact screws $k^2$, $k^3$, $k^4$, according to the variations in the length of the tile,—the elasticity of the spring tongues $k''$, $k^{22}$, $k^{33}$, $k^{44}$, allowing the contact screws to adapt themselves to the variations in length between maximum and minimum length of tile. For instance if the tile being measured is less than of maximum length, contact screw $k'$, and its tongue $k''$, will yield to admit of the contact of the circuit closer $e^3$, on the signal arm with the contact screw $k^2$, and so on for succeeding degrees of shortness.

The operation of measuring and indicating the several lengths of tile passing through the apparatus will be clearly understood by reference to Fig. 5, in which the circuits, and connections are represented diagrammatically with relation to the operative parts. In said Fig. 5, S', S², S³, S⁴ represent electromagnetic indicators, or equivalent electric signals of any kind, interposed in the several circuits, of which the battery Z, or source of electricity, forms a pair in each case. The commutator bar I, (one of which is provided for each feeler E, in the apparatus) is connected electrically by the wire $e^4$, with the circuit closer $e^3$, on the feeler E; and the collector rings $n'$, $n^2$, $n^3$, $n^4$, are electrically connected respectively by the wires $m'$, $m^2$, $m^3$, $m^4$, with the elastic resilient plates or spring tongues $k''$, $k^{22}$, $k^{33}$, $k^{44}$, carrying the contact screw points $k'$, $k^2$, $k^3$, $k^4$. Brushes $n''$, $n^{22}$, $n^{33}$, $n^{44}$, wipe the collector rings $n'$, $n^2$, $n^3$, $n^4$, and are electrically connected by the wires $s'$, $s^2$, $s^3$, $s^4$, with the electric indicating devices S', S², S³, S⁴, which latter are in turn electrically connected by the wires $s''$, $s^{22}$, $s^{33}$, $s^{44}$, with the main circuit line $i'$, having the brush $i$, for contacting with the commutator bar I, as the shaft C, rotates.

It is obvious that the circuit closer $e^3$, will first encounter the screw $k'$, on the spring tongue $k''$, and that the brush $i$, coming in contact with the commutator bar I, the circuit $k'$, $k''$, $m'$, $n'$, $n''$, $s'$, $s''$, $i'$, $i$, I, $e^4$, and $e^3$, will be closed, thereby actuating the electric indicator S'. If the circuit closer $e^3$, advances further it will encounter the screw $k^2$, on the spring tongue $k^{22}$, (the tongue $k''$, yielding) thereby closing the circuit $k^2$, $k^{22}$, $m^2$, $n^2$, $n^{22}$, $s^2$, $s^{22}$, $i'$, $i$, and I, and actuating the electric signal $S^2$; and so on continuously to the end of the series in the case of the shorter tile measured, thus completing all the circuits, which are closed by the contact plate $e^3$, and causing all the electric indicators $S'$, $S^2$, $S^3$, $S^4$, to act. Hence, the longest tile operates only indicator $S'$, the next shorter only $S'$, and $S^2$, and so on, while the shortest tile operates all the indicators. As before intimated this system of connections and contacts between the collector rings $n'$, $n^2$, $n^3$, $n^4$, and contact points $k'$, $k^2$, $k^3$, $k^4$, is duplicated for each feeler E employed; and each contact plate $e^3$, is connected with its own particular commutator bar I.

What I claim as my invention and desire to secure by Letters Patent is,

1. Apparatus for automatically measuring and indicating tile dimensions, comprising a rotatable tile forwarder formed with a tile body seat having a gage rest for the inner end of the seated tile, a rock lever fulcrumed on said rotatable forwarder and formed with a feeler arm and with a signal arm provided with an electric circuit closer, means for automatically rocking the lever to press its feeler arm against the outer end of the seated tile and force the inner end of the tile against the said gage rest on the tile seat, and means for automatically retracting the lever to release the tile for the purpose described.

2. Apparatus for automatically measuring and indicating tile dimensions, comprising a rotatable tile forwarder formed with a tile body seat having a gage rest for the inner end of the seated tile, a rock lever fulcrumed on said rotatable forwarder and formed with a feeler arm and with a signal arm provided with an electric circuit closer, means for automatically rocking the lever to press its feeler arm against the outer end of the seated tile and force the inner end of the tile against the said gage rest on the tile seat, means for automatically retracting the rock lever to release the tile, and a plurality of resiliently mounted electric terminal contacts rotatable with the forwarder and arranged to contact successively with the electric circuit closer on the signal arm of the rock lever, for the purpose described.

3. Apparatus for automatically measuring and indicating tile dimensions, comprising a rotatable tile forwarder formed with a tile body seat having a gage rest for the inner end of the seated tile, a rock lever fulcrumed on said rotatable forwarder and formed with a feeler arm and with a signal arm provided with an electric circuit closer, means for automatically rocking the lever to press its feeler arm against the outer end of the seated tile and force the inner end of the tile against the said gage rest on the tile seat, means for automatically retracting the rock lever to release the tile, a plurality of resiliently mounted electric terminal contacts rotatable with the forwarder and arranged to contact successively with the electric circuit closer on the signal arm of the rock lever, commutator bars rotatable with the forwarder and electrically connected with the electric circuit closer on the signal arm of the rock lever, and collector rings rotatable with the forwarder and each connected electrically with one of said resiliently mounted electrical terminal contacts, for the purpose described.

4. Apparatus for automatically measuring and indicating tile dimensions, comprising a rotatable tile forwarder formed with a tile body seat having an end gage rest for the inner end of a seated tile, a rock lever fulcrumed on said rotatable forwarder and formed with a feeler arm and with a signal arm provided with an electric circuit closer, a feeler rod carried by said forwarder and connected with said rock lever, a spring interposed between a rest on said feeler rod and the forwarder and tending constantly to thrust the feeler arm of the rock lever into contact with the seated tile and press the inner end of the latter against the said gage rest, and a cam arranged to force the feeler rod back against the resistance of the said spring to release the tile, for the purpose described.

5. Apparatus for automatically measuring and indicating tile dimensions, comprising a rotatable tile forwarder formed with a tile body seat having an end gage rest for the inner end of a seated tile, a rock lever fulcrumed on said rotatable forwarder and formed with a feeler arm and with a signal arm provided with an electric circuit closer, a feeler rod carried by said forwarder and connected with said rock lever, a spring interposed between a rest on said feeler rod and the forwarder and tending constantly to thrust the feeler arm of the rock lever into contact with the seated tile and press the inner end of the latter against the said gage rest, a cam arranged to force the feeler rod back against the resistance of the said spring to release the tile, commutator bars rotatable with the forwarder and electrically connected with the electric circuit closer on the signal arm of the rock lever, and collector rings rotatable with the forwarder and each connected electrically with one of said resiliently mounted electrical terminal contacts, for the purpose described.

6. Apparatus for automatically measuring and indicating tile dimensions, comprising a rotatable tile forwarder formed with a plurality of equi-distant peripheral tile seats having end gage rests and forwarding shoulders for the tile, the peripheral surfaces of the forwarder between said seats being eccentric from the outer edges of the forwarding shoulder of one seat to the floor of the next succeeding tile seat so as to seat the tile gradually, means for automatically feeding the tiles to the forwarder, a separate rock lever for each tile seat, each rock lever being fulcrumed on the rotatable forwarder and formed with a feeler arm and with a signal arm provided with an electric circuit closer, means for automatically rocking each lever to press its feeler arm against the outer end of the seated tile and force the inner end of the tile against the gage rest on that particular tile seat, means for automatically retracting the rock lever to release the tile, and a plurality of resiliently mounted electric terminals for each rock lever, rotatable with the forwarder and arranged to contact successively with the electric circuit closer on the signal arm of that particular rock lever, for the purpose described.

WILLIAM B. UPDEGRAFF.

Witnesses:
D. W. GARDNER,
GEO. WM. MIATT.